Kenneth W. Plunkett
Arthur D. Criswell,
INVENTORS.

July 6, 1965 K. W. PLUNKETT ETAL 3,193,793
ELECTRONIC CONNECTOR
Filed March 14, 1963 5 Sheets-Sheet 2

Kenneth W. Plunkett
Arthur D. Criswell,
INVENTORS.

BY *Harry M. Saragovitz*
*Edward J. Kelly*
*Herbert Berl*
*James E. Staudt*

July 6, 1965   K. W. PLUNKETT ETAL   3,193,793
ELECTRONIC CONNECTOR

Filed March 14, 1963   5 Sheets-Sheet 3

Kenneth W. Plunkett
Arthur D. Criswell,
INVENTORS.

Harry M. Saragovitz
BY Edward J. Kelly
Herbert Berl
James E. Staudt

Kenneth W. Plunkett
Arthur D. Criswell,
INVENTORS.

July 6, 1965 K. W. PLUNKETT ETAL 3,193,793
ELECTRONIC CONNECTOR
Filed March 14, 1963 5 Sheets-Sheet 5

Kenneth W. Plunkett
Arthur D. Criswell,
INVENTORS.

BY Harry M. Saragovitz
Edward J. Kelly
Herbert Berl
James E. Staudt

United States Patent Office 3,193,793
Patented July 6, 1965

3,193,793
ELECTRONIC CONNECTOR
Kenneth W. Plunkett and Arthur D. Criswell, Huntsville, Ala., assignors to the United States of America as represented by the Secretary of the Army
Filed Mar. 14, 1963, Ser. No. 265,605
4 Claims. (Cl. 339—176)
(Granted under Title 35, U.S. Code (1952), sec. 266)

The invention described herein may be manufactured and used by or for the Government for governmental purposes without the payment of any royalty thereon.

The present invention relates to a device for connecting electronic systems of missiles. Because of the severe service to which the components of missiles are subjected, elements which are inherently fragile, such as electronic connectors, have been a continuing source of failure in missile systems. Thus, it is imperative that an electronic connector for use in missile systems be of rugged construction and capable of maintaining contact under extremely severe conditions.

The electronic systems of missiles are comprised mainly of a series of modules connected to one another or to a printed circuit board. A module may be defined generally as an electronic assembly comprising a plurality of electronic components generally imbedded in plastic and mounted as a separate entity. Thus, if trouble is developed in a module the entire module is merely disconnected and replaced with another.

Because of the limited space available in a missile, the modules utilized must be as compact as possible. Further, it is essential that the modules be simply and quickly removable. The space allowed for their removal must, therefore, be kept to a minimum. In the past module connectors have been generally of a standard plug-in type which comprised an elongated male member as well as a lengthy female member. It has been generally necessary to form these male and female members of excessive lengths in order to provide sufficient contact area therebetween. Thus, when utilizing conventional plug-in type connectors it has been necessary to provide a space which is at least equal to the length of the male connector to allow for removal of the module.

The present invention has for its object to provide a module connector which permits a large contact area while yet requiring a minimum of space for removal of the module.

Another object of the invention is to provide a connector which may be subjected to lateral or longitudinal movement between the male and female portions without breaking contact therebetween.

A further object of this invention is to provide a connector which will maintain contact under the extreme conditions of temperature, pressure and vibration encountered in a missile.

Still another object of this invention is to provide a connector which will provide a plurality of circuit contacts in a minimum of space and with the least possible electrical resistance.

Another object of this invention is to provide a module connector which may be disconnected by either a vertical or horizontal movement.

The foregoing and other objects of this invention will become more fully apparent from the following detailed description and from the accompanying drawings in which.

Figure 1:
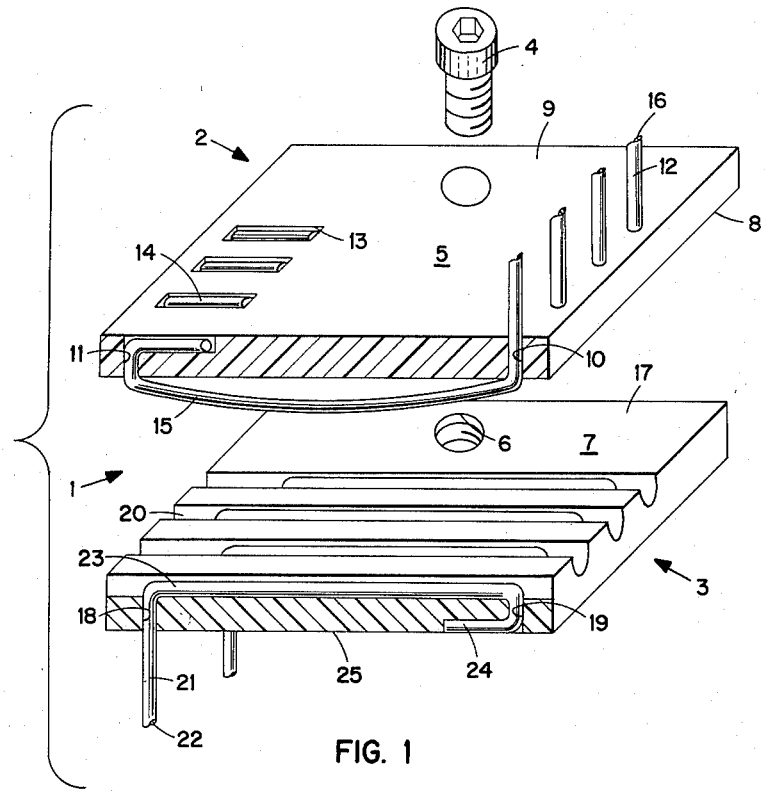
FIGURE 1 is a perspective view of a connector assembly showing the connectors in a disconnectdd position.

Referring now to FIGURE 1, numeral 1 is directed to a connector assembly which comprises two sub-assemblies, 2 and 3, whch are male and female connectors respectively. These connectors may be attached to one another by any convenient means, for example, a cap screw 4 which passes through base block 5 of the male connector and into the threaded aperture 6 in base block 7 of the female connector. Base block 5 has a face surface 8 and a back surface 9, and is provided with a series of laterally spaced apertures as illustrated at 10 and 11. These apertures are generally located adjacent the lateral edges of the base block and provide a means for spacing male conductor elements 12. To aid in the compactness of the device, lateral slots 13 are provided adjacent apertures 11. Each of these slots accommodates a terminal end portion 14 of conductor elements 12. Each conductor element 12 in addition to terminal end 14 is provided with a contact or arcuate spring portion 15 and a free end portion 16. It will be noted that each conductor element 12 is mounted in one pair of laterally spaced apertures 10 and 11.

Figure 2:
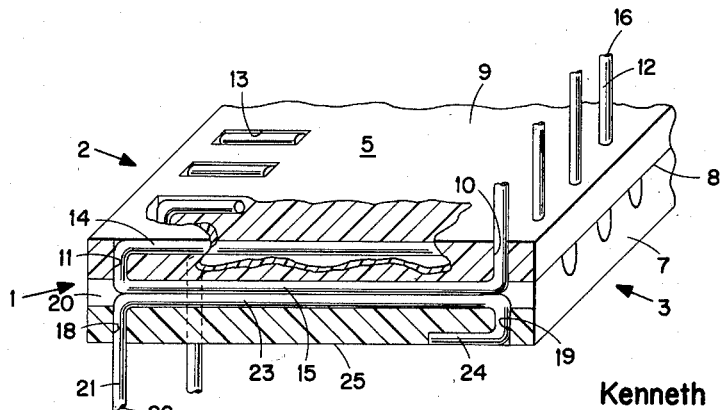
FIGURE 2 is a perspective view of the connector assembly showing the connectors in a connected position.

The base block 7 of female connector 3 has a face surface 17, a back surface 25 and is provided with a series of transverse parallel grooves 20 in its face surface 17. Apertures 18 and 19 are located adjacent the transverse edges of block 7. These apertures are similar to the apertures in the base block of the male connector and are located adjacent the transverse ends and within the transverse parallel grooves 20. A female conductor element 21 is located within each of these grooves and consists of a free end 22, a contact portion 23 and a terminal end portion 24. The conductor elements of the male and female connectors are equally spaced so as to form completed electrical circuits, through their respective contacting portions 15, 23 when the blocks are in a connected position as illustrated in FIGURE 2. Because of the yielding properties of the arcuate spring portion 15 of the male conductor elements, face surface 17 of the female connector will contact face surface 8 of the male connector when the assemblies are in a connected position. It will be noted that the contact portions of the electrical conductor elements of the female connector vary in length at the free end. The free ends of the conductor elements are staggered in this manner so as to increase the clearance therebetween. The free end portions of the male conductors may be staggered in a similar manner.

When the male and female connectors are placed in a connected relationship, as illustrated in FIGURE 2, it will be noted that the arcuate intermediate spring portion 15 of the male connector is depressible against surface 8 along the entire length of this intermediate portion and assumes approximately the configuration of the contact portion 23 of the female connector thus providing a large contact area, and therefore a low electrical resitance connection. Further, should the male and female connector assemblies become somewhat separated due to vibration or strain, the connector elements will remain in contact because of the flexibility of the arcuate spring portion of the male connector.

Figure 3:
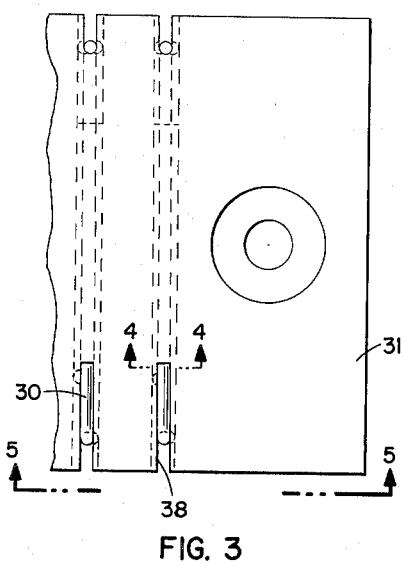
FIGURE 3 is an elevational view of a modified form of the device wherein pairs of connector elements are mounted in a female connector.
Figure 5:
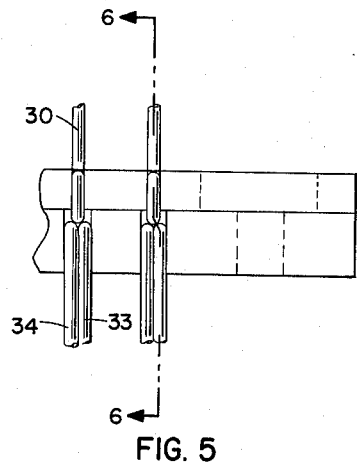
FIGURE 5 is a side view of the device taken on line 5—5 of FIGURE 3.
Figure 4:
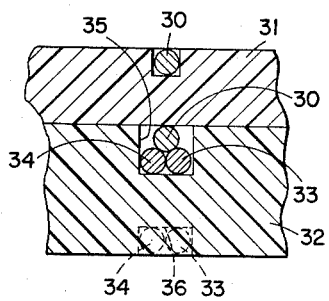
FIGURE 4 is a sectional view taken on line 4—4 of FIGURE 3, showing the arrangement of connector elements when in a connected position.
Figure 6:
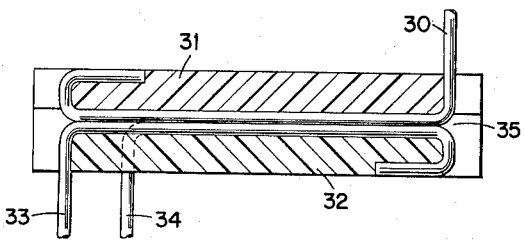
FIGURE 6 is a sectional view taken on line 6—6 of FIGURE 5 and showing the lateral position of the connector elements.
Figure 7:
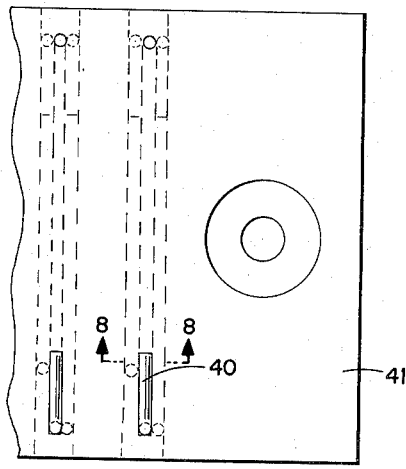
FIGURE 7 illustrates a modified form of the device wherein the male connector elements are located between the connector elements of the female connector.
Figure 9:
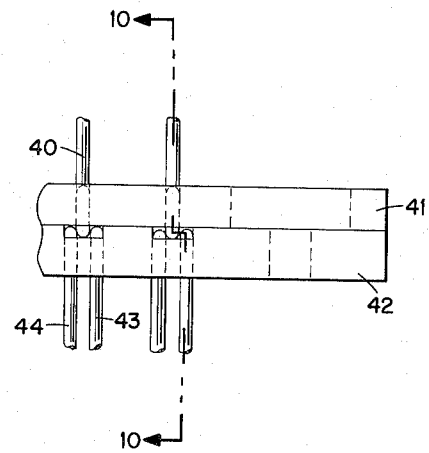
FIGURE 9 is a side elevation of the connector blocks of FIGURE 7.
Figure 8:
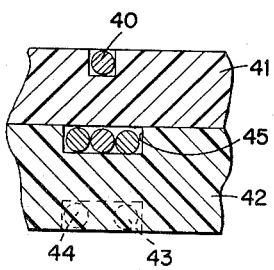
FIGURE 8 is a sectional view taken on line 8—8 of FIGURE 7.

FIGURES 3 and 6 illustrate a modified form of the invention which provides dual outlet circuits from a single inlet. As best illustrated in FIGURE 4, the male conductor element 30 contacts dual conductor elements 33 and 34 which are mounted in female base block 32. In this type of connector assembly the male portion of the connector is constructed similar to the original embodiment illustrated in FIGURE 1 except that the connector elements 30 are spaced by slots 38 rather than by apertures. The female portion differs from the original embodiment in that its dual conductor elements 33 and 34 are mounted in a widened groove 35. It will be noted that the free ends of conductor elements 33, 34 are staggered, as best illustrated in FIGURE 6.

Figure 10:
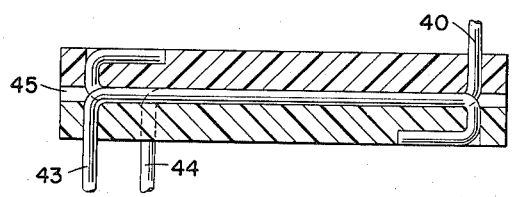
FIGURE 10 is a cross-sectional view taken on line 10—10 of FIGURE 9.

The modification illustrated in FIGURES 7 through 10 is similar to the above mentioned modification in that dual conductor elements are also utilized in the female base block. However, the modifications differ in that the male conductor element 40 of base block 41 is positioned between conductor elements 43 and 44 in the female base block. It will be noted that the conductor elements are staggered as best illustrated in FIGURE 10.

Figure 12:
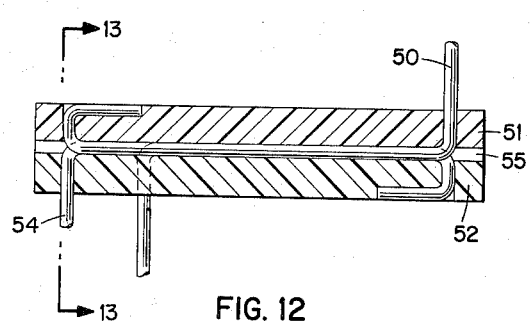
FIGURE 12 is a sectional view taken on line 12—12 of FIGURE 11.
Figure 11:
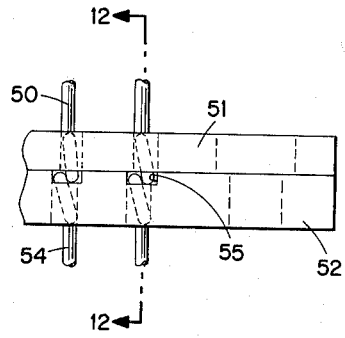
FIGURE 11 is a side elevational view of a further modification of the connector assembly, wherein the connector elements are located in a side by side relationship.
Figure 13:
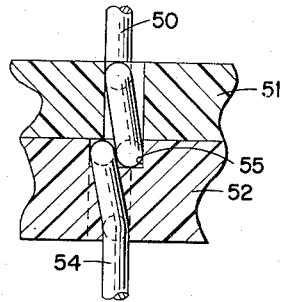
FIGURE 13 is a sectional view taken on line 13—13 of FIGURE 12.

A further modification is illustrated in FIGURES 11 through 13 wherein the electrical conductor elements of the male and female base blocks are located in a side-by-side relationship. Thus, each of the conductor elements 50 and 54 are located in the groove 55 of the female base block.

The above mentioned modifications are very versatile in use in that they may receive single or several conductor elements on each circuits. Further, the height of the base blocks may be determined by an analysis of the available space. For example, the female base block which utilizes a side-by-side connecting relationship between the conductor elements may be more compact in its vertical cross-sectional dimension, while the original device as well as the modification shown in FIGURES 3 through 6 will be more compact in its horizontal dimension.

Figure 14:
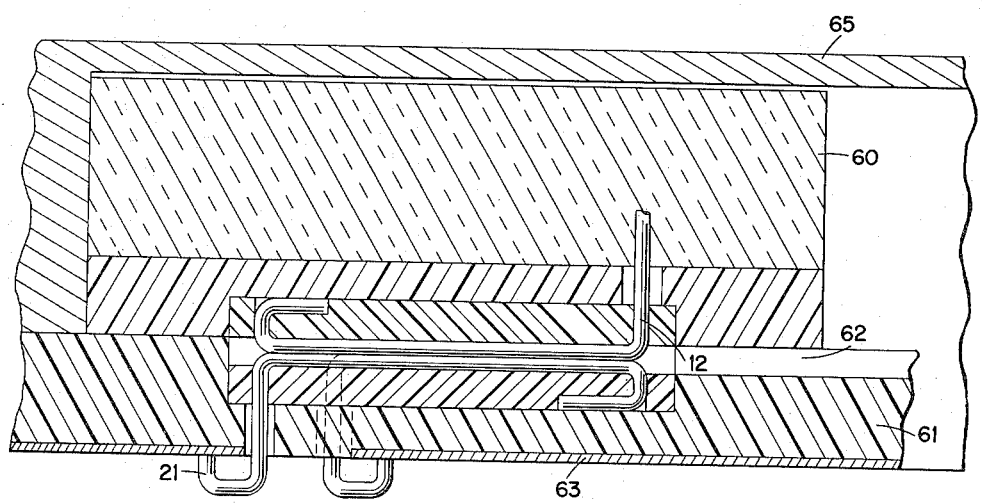
FIGURE 14 is a sectional view of a connector assembly located in a missile system.

As illustrated in FIGURE 14, the present connector assembly may be used in connecting a module 60 to a printed circuit board 61 where a minimum of space is available because of surrounding missile components 65. It will be noted that the male and female connector blocks are flush mounted to conserve space. In extreme cases requiring the ultimate in space conservation, a groove 62 may be cut in printed circuit board 61 thus allowing module 60 to be slid into contact position with a minimum of vertical clearance.

Figure 15:
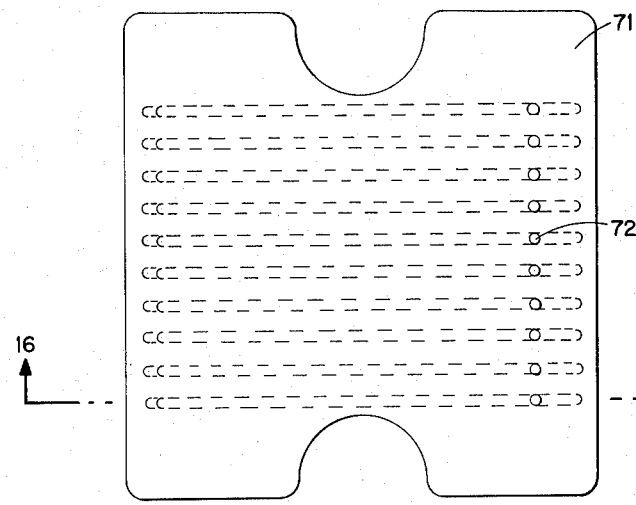
FIGURE 15 is a plan view of a modified form of the male connector.
Figure 16:
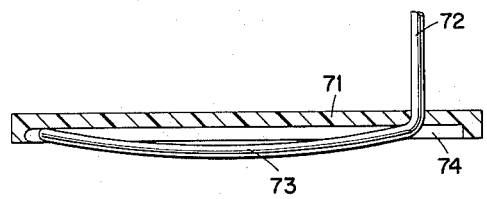
FIGURE 16 is a cross-sectional view taken on line 16—16 of FIGURE 15.
Figure 17:
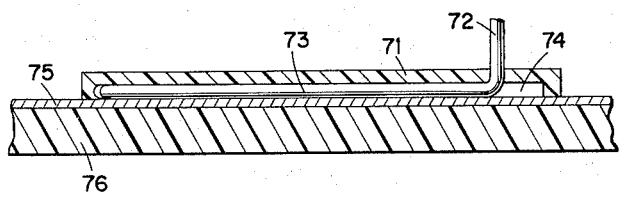
FIGURE 17 is a sectional view showing the modified male connector mounted on a printed circuit board.

A modification of the male portion of the connector assembly is illustrated in FIGURES 15 through 17 wherein base block 71 is provided with a series of grooves 74 for reception of the arcuate spring portion 73 of the male connector element 72. FIGURE 17 illustrates the modified male connector as utilized to contact the circuit strips 75 of a conventional printed circuit board 76.

It is obvious, therefore, that when the connector is assembled, the contacts of both male and female connectors are carried below the upper surface of the female connector permitting a very compact assembly of the connector members. Furthermore, since the contacts are snugly wedged in the grooves below the plane of engagement of the male and female connector members, the contacts will maintain this engaged position even under extreme vibrations.

While there have been shown, described and pointed out the fundamental novel features of this invention, it will be understood that various omissions and substitutions and changes in the form and details of the device illustrated and its operation may be made by those skilled in the art without departing from the spirit of the invention. It is the intention, therefore, to be limited only as indicated by the scope of the claims.

We claim:

1. A connector assembly comprising, an insulating block having a planar surface containing at least two oppositely located aperatures, a first resiliently bowed conductor secured at one end within one of said apertures, the distal end of said conductor extending through the other of said apertures for connection to an external circuit, said conductor including an intermediate bowed portion normally biased out of contact with said planar surface, a second insulating block having a planar surface containing at least two oppositely located apertures and a groove extending transversely across said planar surface, said apertures extending through said second insulating block and in communication with said groove, a second conductor disposed in said groove and secured at one end within one of said apertures, the distal end of said second conductor extending through the other of said apertures for connection to an external circuit, said groove being dimensioned and positioned to receive said bowed intermediate portion of said resilient conductor therein and for insuring aligned parallel relationship of said conductors in said groove, and clamping means cooperatively associated with said insulating blocks for urging said bowed conductor against the force of its bias into linear contact on one side with said planar surface and on its opposite side into linear contact with said second conductor within said groove, said dimensions of said groove being such as to retain said contacts therein in the parallel engaged relation and in engagement with the bottom of said groove for snug-fitting, nonmoveable relationship of said contacts therein.

2. A device as set forth in claim 1, wherein the grooves in the second insulating block are adapted to receive the contact portion of said second electrical conductors and the bowed spring portions of said first conductors in a side by side contacting relationship.

3. A device as set forth in claim 1, wherein two of said second electrical conductors are located in each of the grooves of said second insulating block, said first conductor element being adapted to contact said two electrical conductors simultaneously.

4. A device as set forth in claim 3, wherein said first conductor elements are adapted to be inserted between said two conductor elements located in said grooves.

(References on following page)

References Cited by the Examiner

UNITED STATES PATENTS

| | | | |
|---|---|---|---|
| 2,279,824 | 4/42 | Keefe | 339—92 |
| 2,530,354 | 11/50 | Hayslett | 339—176 X |
| 2,566,805 | 9/51 | Lavander | 339—176 |
| 2,699,534 | 1/55 | Klostermann | 339—220 X |
| 2,858,515 | 10/58 | Thunander | 339—176 X |
| 2,923,911 | 2/60 | Demurjian | 339—217 X |
| 2,942,229 | 6/60 | Berger | 339—176 |
| 3,101,231 | 8/63 | Klostermann | 339—176 |
| 3,106,435 | 10/63 | Yopp | 339—176 |

JOSEPH D. SEERS, *Primary Examiner.*

W. DONALD MILLER, *Examiner.*